United States Patent [19]

Rauch, Sr.

[11] 4,292,083

[45] Sep. 29, 1981

[54] HIGH TEMPERATURE, LOW EXPANSION, CORROSION RESISTANT CERAMIC AND GAS TURBINE

[75] Inventor: Harry W. Rauch, Sr., Lionville, Pa.

[73] Assignee: The United States of America as represented by the United States Department of Energy, Washington, D.C.

[21] Appl. No.: 141,507

[22] Filed: Apr. 18, 1980

[51] Int. Cl.$^3$ .................. C04B 35/04; C04B 35/10; C04B 35/14; C04B 35/48
[52] U.S. Cl. .................. 501/104; 123/41.01; 123/41.71; 501/119
[58] Field of Search .............. 106/57, 62; 123/41.01, 123/41.71

[56] References Cited

U.S. PATENT DOCUMENTS

| | | | |
|---|---|---|---|
| 1,324,546 | 12/1917 | Ferngren | 106/57 |
| 2,308,115 | 1/1943 | Schwartzwalder | 106/57 |
| 2,332,014 | 10/1943 | Schwartzwalder | 106/57 |
| 2,409,844 | 10/1946 | Field | 106/57 |
| 2,424,082 | 7/1947 | Field | 106/57 |
| 2,427,034 | 9/1947 | Wainer | 106/57 |
| 2,624,556 | 1/1953 | Kistler | 257/263 |
| 2,633,622 | 4/1953 | Robinson | 25/156 |
| 2,633,623 | 4/1953 | Robinson | 25/156 |
| 2,684,912 | 7/1954 | Dreher | 106/57 |
| 2,695,242 | 11/1954 | Woodward | 106/57 |
| 2,937,213 | 5/1960 | Hutchings | 260/683 |
| 3,025,175 | 3/1962 | Alfred | 106/57 |
| 3,518,100 | 6/1970 | Whittemore | 106/57 |
| 3,565,645 | 2/1971 | Anderson | 106/57 |
| 3,567,473 | 3/1971 | Drever | 106/57 |
| 3,684,560 | 8/1972 | Crichard | 106/57 |
| 3,758,316 | 9/1973 | Sowards | 106/57 |
| 4,106,947 | 8/1978 | Recasens | 106/57 |

OTHER PUBLICATIONS

Karkhanavala, et al., "The Polymorphism of Cordierite," *J. Am. Ceram. Society* 36(12) pp. 389–392 (1953).
Geller et al., "Thermal Expansion of Some Silicates of Elements in Group II of the Periodic System," *Bur. Stds J Res* 9 (1) pp. 35–46 RP456 (1932).
Nielsen, "Fabrication of Rectangular Cell Ceramic Regenerators for Use in Gas Turbine Engines" presented at Gas Turbine Conference & Products Show, ASME, Mar. 1977, Paper No. 77-G7-111.
McCreight, et al., "Executive Summary Ceramic Oxide Heat Exchange Materials", Presentation at Dept. of Energy Highway Vehicle Systems Contractors Coordination Meeting, May 1978.

*Primary Examiner*—O. R. Vertiz
*Assistant Examiner*—Mark Bell
*Attorney, Agent, or Firm*—Michael F. Esposito; Richard G. Besha; James E. Denny

[57] ABSTRACT

The present invention relates to $ZrO_2$-$MgO$-$Al_2O_3$-$SiO_2$ ceramic materials having improved thermal stability and corrosion resistant properties. The utilization of these ceramic materials as heat exchangers for gas turbine engines is also disclosed.

12 Claims, 2 Drawing Figures

THERMAL STABILITY OF VARIOUS $ZrO_2$-$MgO$-$Al_2O_3$-$SiO_2$ (ZrMAS) MATERIALS AFTER EXPOSURE

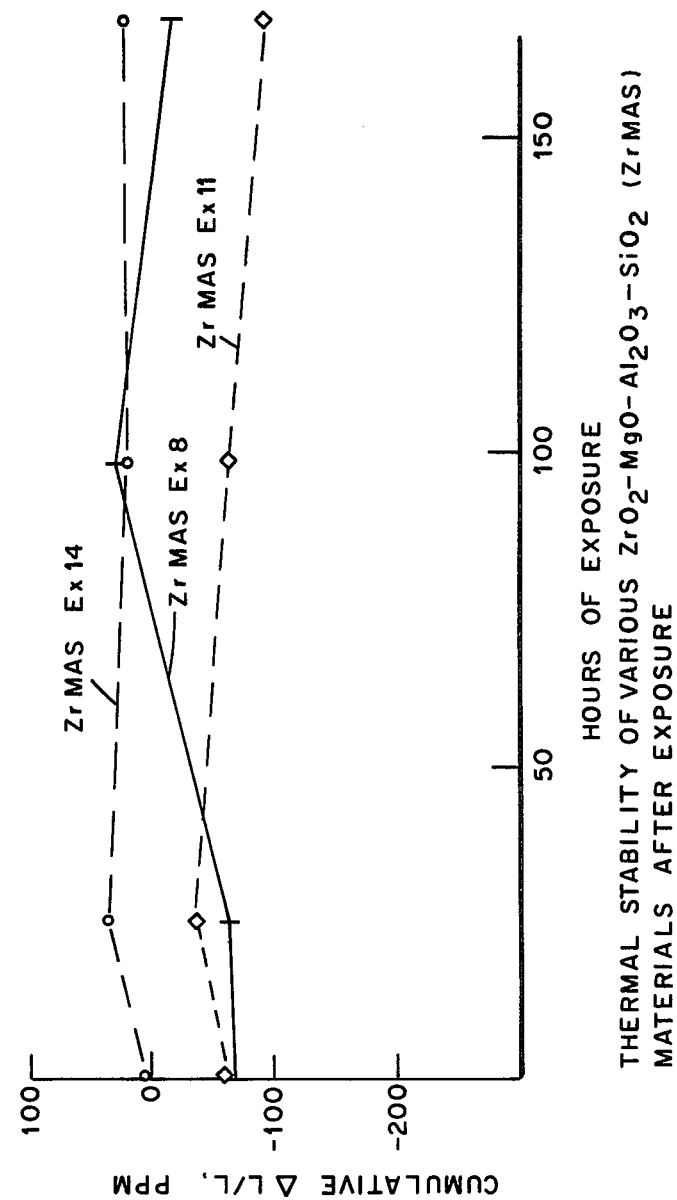

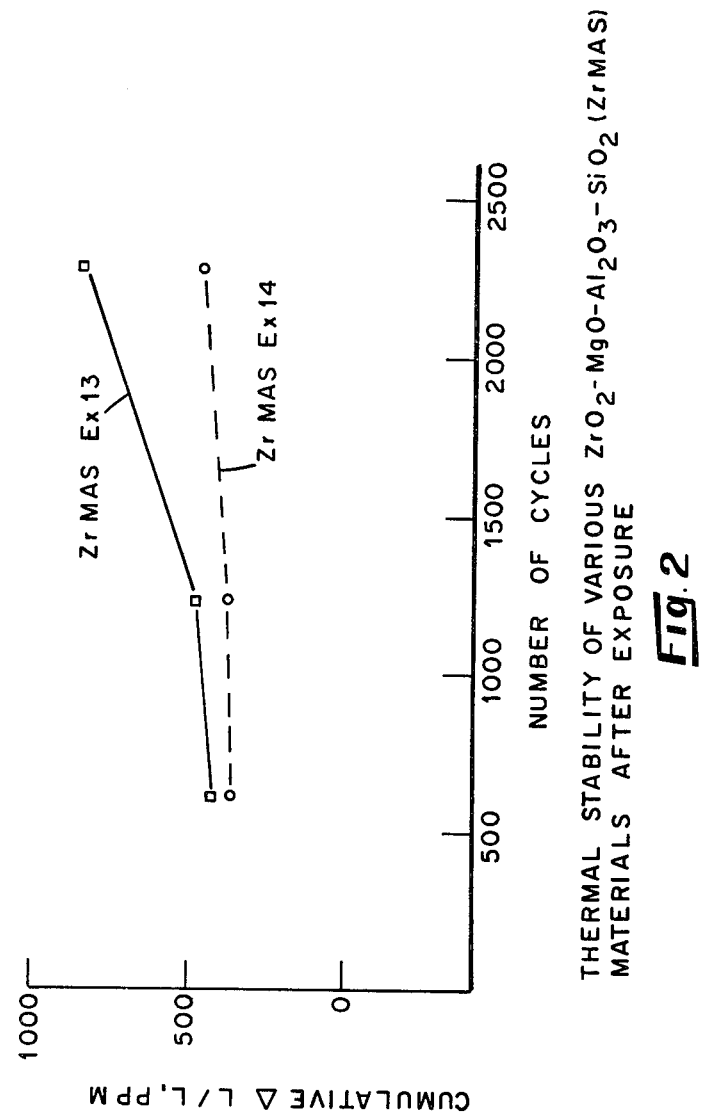

HIGH TEMPERATURE, LOW EXPANSION, CORROSION RESISTANT CERAMIC AND GAS TURBINE

The United States Government has rights in this invention pursuant to Contract NAS3-19698 between the National Aeronautics and Space Administration and General Electric.

BACKGROUND OF THE INVENTION

The present invention relates to high temperature, low expansion, corrosion resistant ceramic materials and, more particularly, to the use of these materials for heat exchangers in gas turbine engines. The present invention finds specific utility in the discovery that a ceramic material containing $ZrO_2$, $MgO$, $Al_2O_3$ and $SiO_2$ as the major ingredients can be formed into a low cost, high temperature, low expansion, corrosion resistant ceramic heat exchanger suitable for use in a gas turbine engine over a wide range of high temperatures, for example as high as about 1200° C.

It has previously been recognized that the continuous combustion engine (i.e., gas turbine and Sterling Cycle) offers a substantial improvement in fuel efficiency in comparison with conventional reciprocating engines. A principal problem associated with the development of the continuous cycle engine is the manufacture of a low cost heat exchanger which can also withstand the high temperature and corrosive environment present during the operation of the engine. In a typical engine application there will be one (Sterling engine) or two (gas turbine engine) wheels ranging from 20-30 inches in diameter and 3-4 inches thick rotating at about 30 rpm through a hub or ring gear mounting and drive system. During the expected operating lifetime of an automobile engine, the wheel will make over 100 million revolutions and, therefore, the heat exchanger is exposed to that many thermal shock cycles. To best withstand these thermal shock cycles, the heat exchanger must be made of a very low thermal expansion material in a form that provides a large surface area to volume ratio. Honeycomb or similar type structures where the walls are typically about 3-8 mils thick and contain from 500-1000 openings/$in^2$ are suitable and meet these requirements.

In addition to low thermal expansion characteristics, the heat exchanger material must have excellent chemical and thermal stability. In previous work, extreme changes in the shape of the heat exchanger and, therefore, loss of its efficiency because of air leakage have occurred due to chemical changes as well as thermally induced effects in the exchanger material. The chemical changes were more severe and caused by sulfur (present in the exhaust gas) and salt (present in the incoming air).

Taking all of the above factors into account and, additionally, considering the economic problems involved have led to the selection of ceramic materials for use as the heat exchanger material. Previous work in the development of ceramic heat exchangers led to the discovery of Cordierite ($Mg_2$-$Al_4Si_5O_{18}$) materials. These materials perform suitably in the 800°-1000° C. temperature range with a thermal expansion characteristic of $2.1 \times 10^6$/°C. in that temperature range. However, there are associated with these materials recognized problems with salt corrosion and/or thermal stability. It remains as a problem in the art to develop a ceramic material which will perform satisfactorily at significantly higher temperatures (e.g., 1100°-1200° C.) with substantially no thermal stability or corrosion resistance problems.

As evidenced by U.S. Pat. Nos. 2,624,556; 2,937,213; 2,633,622; 2,633,623; and 3,565,645; $ZrO_2$-$MgO$-$Al_2O_3$-$SiO_2$ ceramics have been used as heat exchange materials. However, none of these patents recognize that specific $ZrO_2$-$MgO$-$Al_2O_3$-$SiO_2$ ceramics possess unexpectedly superior thermal expansion and corrosion resistant properties which allow them to be used in high temperature (e.g. 1200° C.), high corrosive environments such as those present in gas turbine engines.

SUMMARY OF THE INVENTION

It is a primry object of this invention to provide a novel $ZrO_2$-$MgO$-$Al_2O_3$-$SiO_2$ ceramic material possessing excellent high temperture, low thermal expansion stability over a wide range of high temperatures, for example, as high as about 1200° C.

It is a further object of this invention to provide a novel $ZrO_2$-$MgO$-$Al_2O_3$-$SiO_2$ ceramic material characterized by a thermal expansion characteristic of no greater than $2.0 \times 10^{-6}$/°C. over a temperature range of 25°-1000° C., preferably 25°-1200° C.

It is a further object of this invention to provide a novel $ZrO_2$-$MgO$-$Al_2O_3$-$SiO_2$ ceramic material possessing improved corrosion resistance to salts and sulfur.

It is a further object of this invention to provide a novel $ZrO_2$-$MgO$-$Al_2O_3$-$SiO_2$ ceramic useful as a heat exchanger in gas turbine engines.

Additional objects, advantages and novel features will be set forth in part in the description which follows, and in part, will become apparent to those skilled in the art upon examination of the following or may be learned by practice of the invention. The objects and advantages of the invention may be realized and obtained by means of the combinations particularly pointed out in the appended claims.

To achieve the foregoing and other objects and in accordance with the purpose of the present invention, as embodied and broadly described herein, the ceramic material of the present invention contains as its primary ingredients about 3-13 weight percent MgO, about 29-44 weight percent $Al_2O_3$, about 40-51 weight percent $SiO_2$ and about 3-17 weight percent $ZrO_2$.

Preferrably, the ceramic material comprises about 11-13 weight percent MgO, about 33-35 weight percent $Al_2O_3$, about 48-51 weight percent $SiO_2$ and about 3-10 weight percent $ZrO_2$, characterized by a thermal expansion characteristic of no greater than $2.0 \times 10^{-6}$/°C. over a temperature range of 25°-1000° C. In a further preferred embodiment the thermal expansion characteristic of the ceramic material is no greater than $2.0 \times 10^{-6}$/°C. over a temperature range of 25°-1000° C.

The accompanying drawings which are incorporated in and form a part of this specification are described below.

BRIEF DESCRIPTION OF THE DRAWINGS

FIG. 1 is a graphic illustration of the thermal stability of several preferred embodiments of the ceramic material of the present invention at 1000° C.; and FIG. 2 is a graphic illustration of the ceramic material set forth in Examples 13 and 14 of Table I at 1200° C.

Reference will now be made in detail to the present invention and its preferred embodiments.

DETAILED DESCRIPTION OF THE INVENTION

In accordance with the present invention, a high temperature, low expansion, corrosion resistance ceramic material may comprise about 3-13 weight percent MgO, about 29-44 weight percent $Al_2O_3$, about 40-51 weight percent $SiO_2$ and about 3-17 weight percent $ZrO_2$. To form this ceramic material, these compounds are mixed and ball milled in a suitable vessel to produce a fine powder. The resultant fine powder is then fabricated into a bar-shaped specimen by the use of conventional techniques, for example, cold pressing under high pressure. This bar-shaped specimen is subsequently fired in an oven maintained at 1000° C. for 15 hours. After firing, the bar-shaped specimen remains in the oven for a 4 hour soak at 1400° C. The bar-shaped specimen is then removed from the oven and allowed to cool.

In a preferred embodiment of the invention, the ceramic material consists essentially of about 11-13 weight percent MgO, about 33-35 weight percent $Al_2O_3$, about 48-51 weight percent $SiO_2$ and about 3-10 weight percent $ZrO_2$. The components are mixed, ball milled, shaped, fired and cooled in substantially the same manner previously described.

It is, of course, understood that the compounds utilized in forming the above described ceramic material may be supplied from any conventional source. For example, $ZrO_2$ may be supplied from Zircon. Cordierite ($Mg_2Al_4Si_3O_{18}$) may be utilized as the source of MgO, $Al_2O_3$ and $SiO_2$. The combination of clay (aluminosilicate) and Talc ($Mg_3Si_4O_{10}(OH)_2$) may also provide an inexpensive source for the MgO, $Al_2O_3$ and $SiO_2$ components of the ceramic material.

It is understood that the above identified conventional sources of the compounds of the ceramic material may contain impurities such as $TiO_2$, $Fe_2O_3$, CaO and the like. These impurities, present in trace amounts, will now materially effect the properties of the ceramic material of the present invention.

FIG. 1 is a graphic illustration of the thermal stability of several preferred embodiments of the ceramic material of the present invention. The thermal stability data plotted in FIG. 1 illustrates results obtained using the ceramic material of examples 8, 11 and 14 of Table I set forth below. The graph plots the change in length of the specimen (L) over the length of the specimen (L) in parts/million (PPM) versus duration of exposure at 1000° C. in hours. FIG. 1 demonstrates that the specimens of the present invention maintained their dimensional stability after exposure to 1000° C. for 168 hours.

FIG. 2 is a graphic illustration of the thermal stability of the ceramic material of Examples 13 and 14 set forth in Table I (see below) at 1200° C. The thermal stability graph of FIG. 2 plots the change in length of the specimen (L) over the length of the specimen (L) in parts/million (PPM) versus the number of thermal cycles to which the specimen has been exposed. A thermal cycle is defined as 1.5 minutes travel time into the furnace (heat-up), 3.8 minutes holding time in the furnace, and finally 1.5 minutes out of the furnace (cool-down). Accordingly, one cycle equals approximately 7 minutes. The graph clearly indicates that the specimens of the present invention maintained their dimensional stability after exposure to over 2000 thermal cycles. It should be noted that the FIG. 2 data approximates the conditions present in a gas turbine engine because the thermal cycles used to test the specimens are similar to the thermal shock cycle present in a gas turbine engine.

The following examples set forth in Table I illustrate the thermal stability and corrosion resistant properties obtained in the use of the present invention. The amount of each component in the ceramic material of the present invention is set forth in weight percent (w/o). The numbers 1 to 14 appearing on the top of the table indicate the example number. Accordingly, Table I comprises 14 examples illustrating various ceramic materials within the range of the present invention. In addition, Table I includes the data reported for each example when tested for corrosion resistance, thermal stability, density and water absorption. Table I appears below:

TABLE I

COMPOSITIONS INVESTIGATED AND VARIOUS DATA OBTAINED*

| | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| MgO | 6.7 | 6.7 | 3.5 | 6.9 | 10.4 | 8.3 | 5.5 | 11.1 | 11.1 | 11.1 | 11.7 | 11.7 | 12.4 | 12.4 |
| $Al_2O_3$ | 30.8 | 31.8 | 38.7 | 32.0 | 34.3 | 38.3 | 43.6 | 35.8 | 32.8 | 29.8 | 31.5 | 34.5 | 33.1 | 33.1 |
| $Fe_2O_3$ | 2.2 | 2.2 | 0.5 | 0.3 | 0.1 | 0.3 | 0.4 | 0.2 | 0.1 | 0.1 | 0.1 | 0.1 | 0.1 | 0.1 |
| $SiO_2$ | 42.5 | 41.5 | 40.5 | 43.4 | 48.4 | 46.3 | 43.5 | 48.9 | 48.7 | 48.6 | 49.6 | 49.7 | 50.6 | 50.7 |
| $TiO_2$ | 1.7 | 1.7 | 0.4 | 0.6 | 0.1 | 0.2 | 0.4 | 0.4 | 0.2 | 0.2 | 0.1 | 0.2 | 0.1 | 0.1 |
| $ZrO_2$ | 16.1 | 16.1 | 16.7 | 16.7 | 6.7 | 6.7 | 6.6 | 3.3 | 6.7 | 10.0 | 6.7 | 3.3 | 3.3 | 3.3 |
| CaO | — | 0.5 | — | — | — | — | — | — | — | — | — | — | — | — |
| Corrosion Data (% Weight Change) | | | | | | | | | | | | | | |
| Molten Sea Salt | 4.3 | — | +4.8 | +0.03 | — | +0.7 | — | — | +4.63 | +4.2 | +0.7 | +2.4 | +0.4 | +0.6 |
| Hot Conc. $H_2SO_4$ | −0.08 | — | −0.07 | −0.08 | −1.6 | ** | — | — | — | — | −0.11 | −0.06 | −0.05 | — |
| Thermal Expansion, x $10^{-6}$/°C. 25-1000° C. | 3.85 | 3.54 | 4.51 | 3.85 | 2.31 | 2.80 | 3.69 | 1.74 | 2.00 | 1.98 | 1.85 | 1.74 | 2.90 | 1.90 |
| Density, gm/cc | 2.76 | 2.66 | 2.50 | 2.67 | 2.48 | 2.47 | 2.71 | 2.49 | 2.53 | 2.57 | 2.57 | 2.50 | 2.49 | 2.44 |
| % of Theoretical | 83.7 | 80.6 | 72.9 | 83.4 | 84.4 | 81.9 | 86.7 | 89.7 | 88.2 | 86.7 | 89.8 | 90.3 | 90.2 | 87.8 |
| Water Absorption % | 8.5 | 8.4 | 3.1 | 2.3 | 7.8 | 7.8 | 0 | 0.3 | 0.3 | 0.4 | 0.1 | 0.1 | 0.1 | 0.2 |

*All specimens fired at 1000° C./15 hours plus 1400° C./4 hours.
**Specimens fractured in 1000° C. drying cycle.
***Value for ZrMAS-5 through -14 obtained from measurements made with a silica sample holder and push-rod, all other data obtained with an alumina system.

In studying the results set forth in Table I, the following observations should be made:

Corrosion Resistance

The ceramic material of the present invention must possess a high resistance to corrosion. The Corrosion Data presented in Table I was determined by recording weight changes percent gain (+) or loss (−) after a specimen had been immersed in molten (750°) sea salt or hot (330° C.) concentrated sulfuric acid. The smaller the percentage weight gain or loss the more corrosion resistant the ceramic material.

Thermal Expansion

To achieve the objects of the present invention, the ceramic material of the present invention must possess high temperature stability. Accordingly, it is necessary that the ceramic material possess a low thermal expansion characteristic. All the ceramic materials set forth in Table I possess extremely low thermal expansion characteristics.

Example 8–12 and 14 possess thermal expansion characteristics of no greater than $2.0 \times 10^{-6}/°C.$ over a temperature range of 25°–1000° C. The ceramic materials of these examples are preferred because of their extremely low thermal expansion characteristic. In addition, it should be noted that slight variations in the weight percent of each component of the ceramic material within the preferred range disclosed above will result in a ceramic material possessing a thermal expansion characteristic of no greater than $2.0 \times 10^{-6}/°C.$ over a temperture range of 25°–1200° C.

The ceramic material of the present invention possessed the above discussed low thermal expansion characteristics in the monolithic form. It should be noted that the ceramic material of the present invention formed in a honeycomb configuration exhibited a slight increase in thermal expansion characteristics (i.e. $3.0 \times 10^{-6}/°C.$ over a temperature range of 25°–1200° C.), but still retained its excellent forming and corrosion resistance characteristics.

Water Absorption And Density

The ceramic material of the present invention must have a low porosity and high density. Table I illustrates that the ceramic material of the disclosed invention have exhibited values of up to 90 percent of theoretical density. The water absorption value reported in Table I is a measure of the porosity of the ceramic material. A low water absorption value indicates low or closed porosity which is highly desirable.

The resulting thermal expansion, corrosion resistance, water absorption, and theoretical density values set forth in Table I, and the data presented in FIGS. 1 and 2, clearly, demonstrate that the ceramic materials of the present invention are capable of withstanding severe thermal shock and high corrosive environments, similar to the conditions present in a gas turbine engine system.

The foregoing description of the preferred embodiments of the invention have been presented for purposes of illustration and description. It is not intended to be exhaustive or to limit the invention to the precise form disclosed. The embodiments were chosen and described in order to best explain the principles of the invention and its practical applications to thereby enable others skilled in the art to best utilize the invention in various embodiments and with various modifications as are suited to the particular use contemplated. It is intended that scope of the invention be defined by the claims appended hereto.

What we claim as our invention is:

1. A high temperature, low expansion, corrosion resistant ceramic material consisting essentially of about 3–13 weight percent MgO, about 29–44 weight percent $Al_2O_3$, about 40–51 weight percent $SiO_2$, and about 3–17 weight percent $ZrO_2$.

2. The ceramic material of claim 1 wherein the MgO is present in about 11–13 weight percent.

3. The ceramic material of claim 1 wherein the $SiO_2$ is present in about 48–51 weight percent.

4. The ceramic material of claim 1 wherein the $ZrO_2$ is present in about 3–10 weight percent.

5. The ceramic material of claim 1 wherein the thermal expansion characteristic is no greater than $2.0 \times 10^{-6}/°C.$ over a temperature range of 25°–1200° C.

6. The ceramic material of claim 1 consisting essentially of about 11–13 weight percent MgO, about 33–35 weight percent $Al_2O_3$, about 48–51 weight percent $SiO_2$ and about 3–10 weight percent $ZrO_2$, said material being further characterized by a thermal expansion characteristic of no greater than $2.0 \times 10^{-6}/°C.$ 7. The ceramic material of claim 6 being further characterized by a thermal expansion characteristic of no greater than $2.0 \times 10^{-6}/°C.$ over a temperature range of 25°–1200° C.

8. A ceramic gas turbine heat exchanger consisting essentially of the composition recited in claim 1.

9. A ceramic gas turbine heat exchanger consisting essentially of the composition recited in claim 2.

10. A ceramic gas turbine heat exchanger consisting essentially of the composition recited in claim 3.

11. A ceramic gas turbine heat exchanger consisting essentially of the composition recited in claim 4.

12. A ceramic gas turbine heat exchanger consisting essentially of about 11–13 weight percent MgO, about 33–35 weight percent $Al_2O_3$, about 48–51 weight percent $SiO_2$ and about 3–10 weight percent $ZrO_2$.

* * * * *